US010719750B2

(12) United States Patent
Herrington et al.

(10) Patent No.: US 10,719,750 B2
(45) Date of Patent: *Jul. 21, 2020

(54) CARD WITH ERGONOMIC TEXTURED GRIP

(71) Applicant: Capital One Services, LLC, McLean, VA (US)

(72) Inventors: Daniel Herrington, New York, NY (US); Tyler Maiman, Melville, NY (US); Stephen Schneider, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/668,992

(22) Filed: Oct. 30, 2019

(65) Prior Publication Data

US 2020/0151530 A1 May 14, 2020

Related U.S. Application Data

(63) Continuation of application No. 16/417,784, filed on May 21, 2019, now Pat. No. 10,496,913, which is a continuation of application No. 16/186,469, filed on Nov. 9, 2018, now Pat. No. 10,360,489.

(51) Int. Cl.

| *G06K 19/07* | (2006.01) |
|---|---|
| *G06K 19/06* | (2006.01) |
| *G06K 19/077* | (2006.01) |
| *B60R 21/00* | (2006.01) |

(52) U.S. Cl.
CPC ......... *G06K 19/0723* (2013.01); *B60R 21/00* (2013.01); *G06K 19/06187* (2013.01); *G06K 19/07718* (2013.01); *B60R 2021/0002* (2013.01); *B60R 2021/0032* (2013.01)

(58) Field of Classification Search
CPC ......... G06K 19/00; G06K 19/06; G06K 19/07
USPC ................. 235/492, 487, 488, 375, 380
See application file for complete search history.

(56) References Cited

U.S. PATENT DOCUMENTS

| D224,569 | S | 8/1972 | Regan et al. | |
|---|---|---|---|---|
| D602,522 | S | 10/2009 | Field et al. | |
| D650,440 | S | 12/2011 | Irwin, Jr. | |
| D776,755 | S | 1/2017 | Witsil et al. | |
| D845,387 | S | 4/2019 | Mills et al. | |
| D866,660 | S | 11/2019 | Mills et al. | |
| D868,887 | S | 12/2019 | Mills et al. | |
| 2006/0255155 | A1* | 11/2006 | Cranston | B32B 38/06 235/488 |
| 2010/0276920 | A1* | 11/2010 | Woodman | B42D 25/00 283/75 |
| 2013/0320097 | A1* | 12/2013 | Anderson, II | G06K 19/04 235/492 |
| 2014/0300556 | A1* | 10/2014 | Mathew | G09G 5/006 345/173 |

* cited by examiner

*Primary Examiner* — Edwyn Labaze

(57) ABSTRACT

Approaches herein provide a transaction card with an ergonomic textured grip. In some approaches, a card includes a body having a first main side and a second main side, and an identification chip along the first main side of the body. The card may further include a textured grip along the second main side of the body, wherein the textured grip comprises a plurality of curvilinear grip elements extending in an undulating arrangement between a first end and a second end of the textured grip.

13 Claims, 6 Drawing Sheets

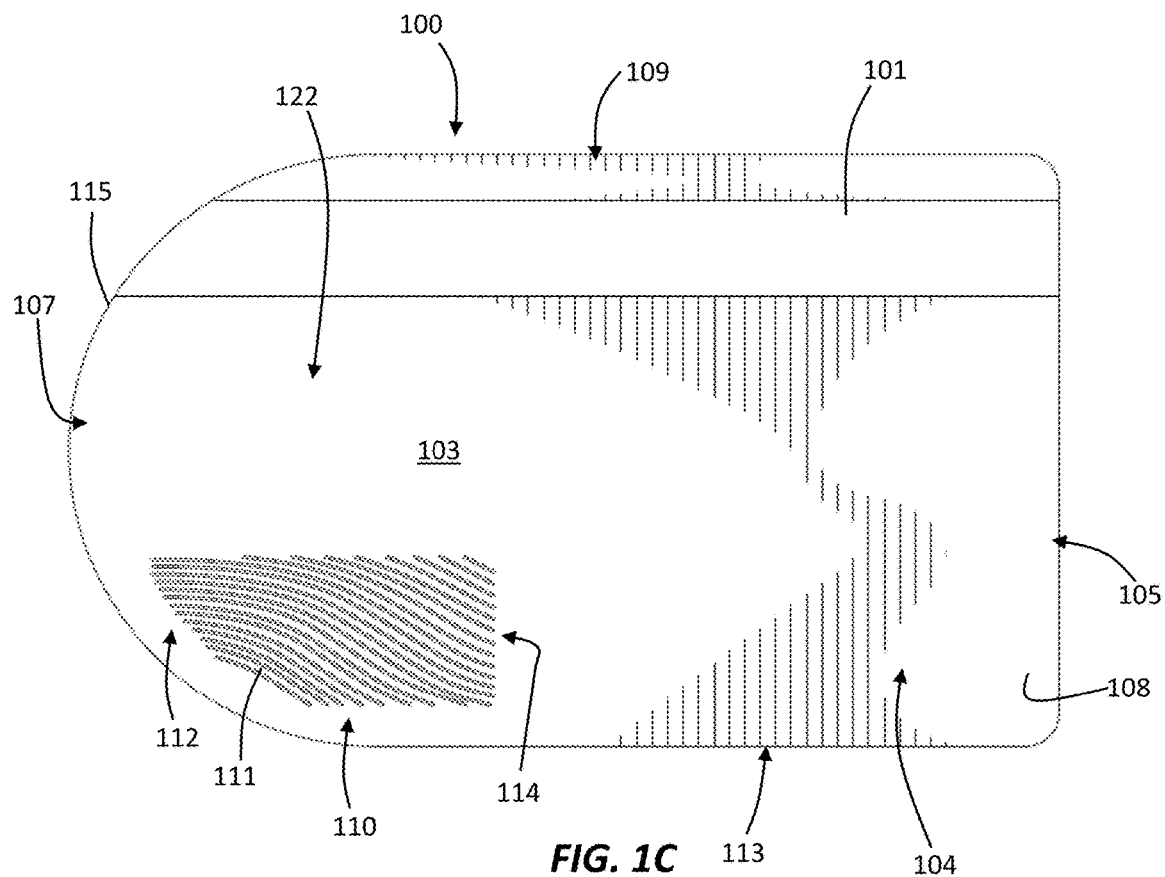
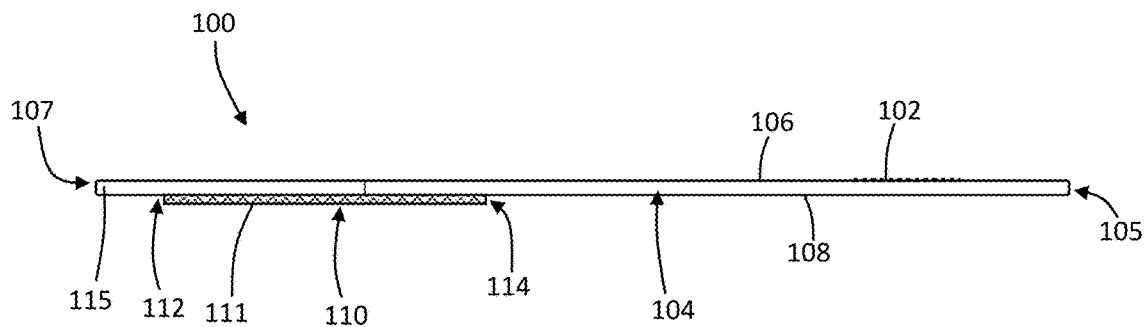

300

| Provide a body of a card having first and second main sides, the first main side including an identification chip and the second main side including a magnetic stripe | —302 |

↓

| Form a textured grip along the second main side of the body, the textured grip including a plurality of curvilinear grip elements extending in an undulating arrangement between first and second ends of the textured grip | —304 |

*FIG. 4*

ND ERGONOMIC TEXTURED
CARD WITH ERGONOMIC TEXTURED GRIP

CROSS-REFERENCE TO RELATED APPLICATIONS

This is a continuation of pending U.S. Non-provisional patent application Ser. No. 16/417,784, filed May 21, 2019, which is a continuation of U.S. Non-provisional patent application Ser. No. 16/186,469, filed Nov. 9, 2018, now U.S. Pat. No. 10,360,489, the entire contents of both applications are incorporated herein by reference.

FIELD

Embodiments of the present disclosure relate to transaction cards and, more particularly, to transaction cards with an ergonomic textured grip.

BACKGROUND

Transaction cards, such as credit and debit cards, have increasingly become a primary means for customers to complete financial transactions. Typically, transaction cards are cast out of a plastic material, such as polycarbonate (PC) or polyvinyl chloride (PVC), using an injection molding process. The plastic card may then be modified to add functional and/or visual features. For example, a magnetic strip may be affixed to one side, the card may be stamped with the card number and customer name, and color or a design may be added for appearance.

Some transaction card providers are moving away from using magnetic stripe technology and now additionally or alternatively include more advanced transaction components attached to or embedded within a transaction card. For example, some transaction cards now include microchips (e.g., microchips based on the Europay, MasterCard, and Visa standard, also called "EMV chips") that more securely and efficiently manage card and customer information. Some cards now include near field communication (NFC) and/or radio-frequency identification (RFID) components that can wirelessly communicate with outside devices (e.g., a point of sale device, mobile device, etc.). Additionally, some transaction card providers are moving away from traditional, rectangular shaped transaction cards. However, as transaction card designs become more complex, consumers have shown issues in identifying the appropriate orientation to swipe the magnetic stripe on the transaction card. Even when shape is used to create a visual identifier, some consumers have difficulty holding the card correctly. Thus, it is with respect to these and other considerations that the improvements of the present embodiments are provided.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In at least one approach according to the disclosure, a card may include a body having a first main side and a second main side, and an identification chip along the first main side of the body. The card may further include a textured grip along the second main side of the body, wherein the textured grip comprises a plurality of curvilinear grip elements extending in an undulating arrangement between a first end and a second end of the textured grip.

In another approach according to the disclosure, a transaction card may include a body having a first main side and a second main side, and an identification chip coupled to the first main side of the body. The transaction card may further include a textured grip and a magnetic stripe disposed along the second main side of the body, wherein the textured grip comprises a plurality of curvilinear grip elements extending in an undulating arrangement between a first end and a second end of the textured grip, and wherein the magnetic stripe is positioned proximate a first side of the body and the textured grip is positioned proximate a second side of the body.

In yet another approach according to the disclosure, a method of forming a card may include providing a body having a first main side and a second main side, the first main side including an identification chip and the second main side including a magnetic stripe, and forming a textured grip along the second main side of the body. The textured grip may include a plurality of curvilinear grip elements extending in an undulating arrangement between a first end and a second end of the textured grip, wherein the magnetic stripe is positioned proximate a first side of the body and the textured grip is positioned proximate a second side of the body.

BRIEF DESCRIPTION OF THE DRAWINGS

The accompanying drawings illustrate example approaches of the disclosure, including the practical application of the principles thereof, as follows:

FIG. 1C is a bottom view of the transaction card of FIG. 1A, in accordance with embodiments of the present disclosure;

FIG. 1D is a side view of the transaction card of FIG. 1A, in accordance with embodiments of the present disclosure;

FIG. 4 illustrates a flowchart for forming a transaction card in accordance with embodiments of the present disclosure.

Figure 1A:
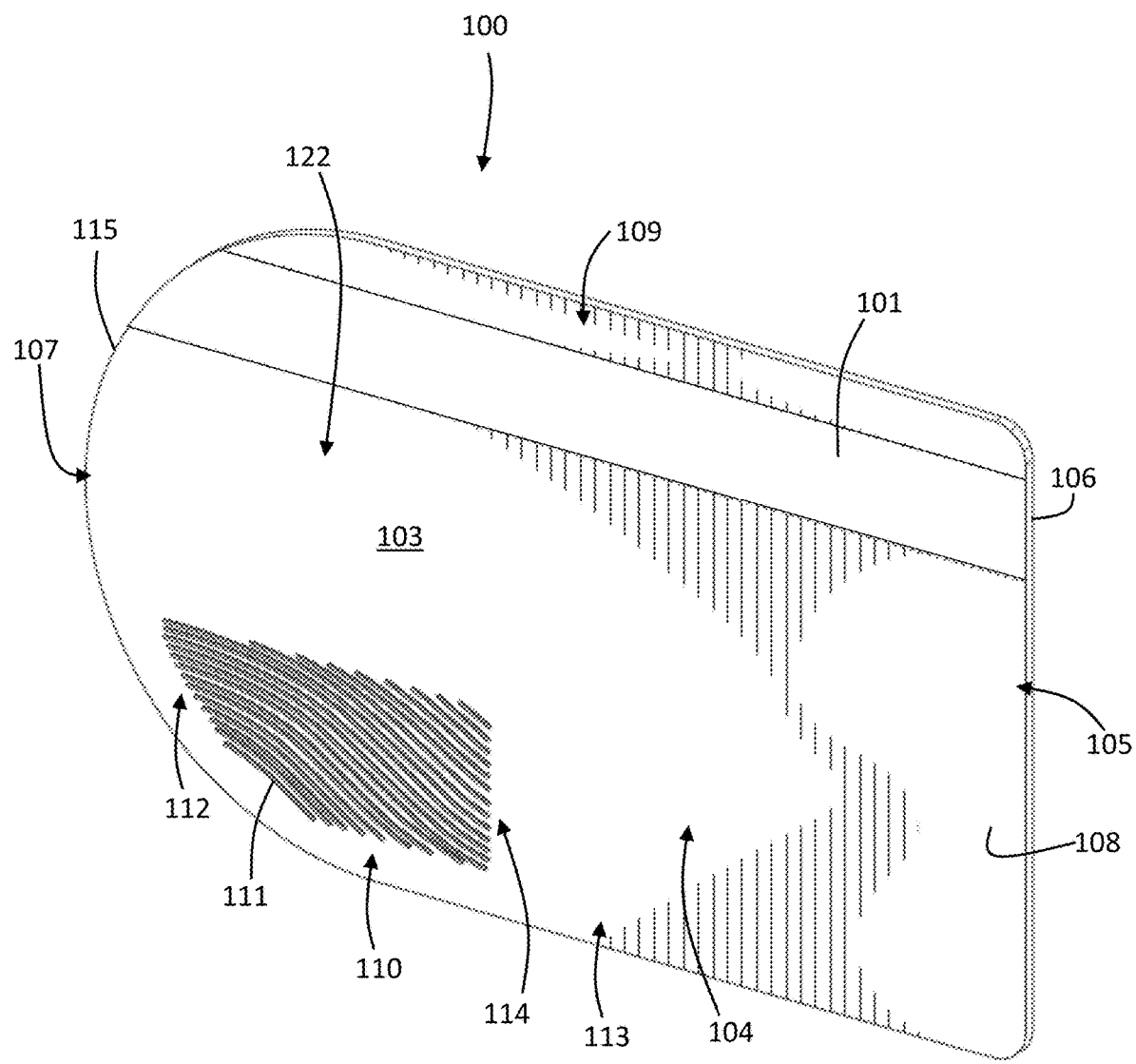
FIG. 1A is a perspective view illustrating a transaction card, in accordance with embodiments of the present disclosure.
Figure 1B:
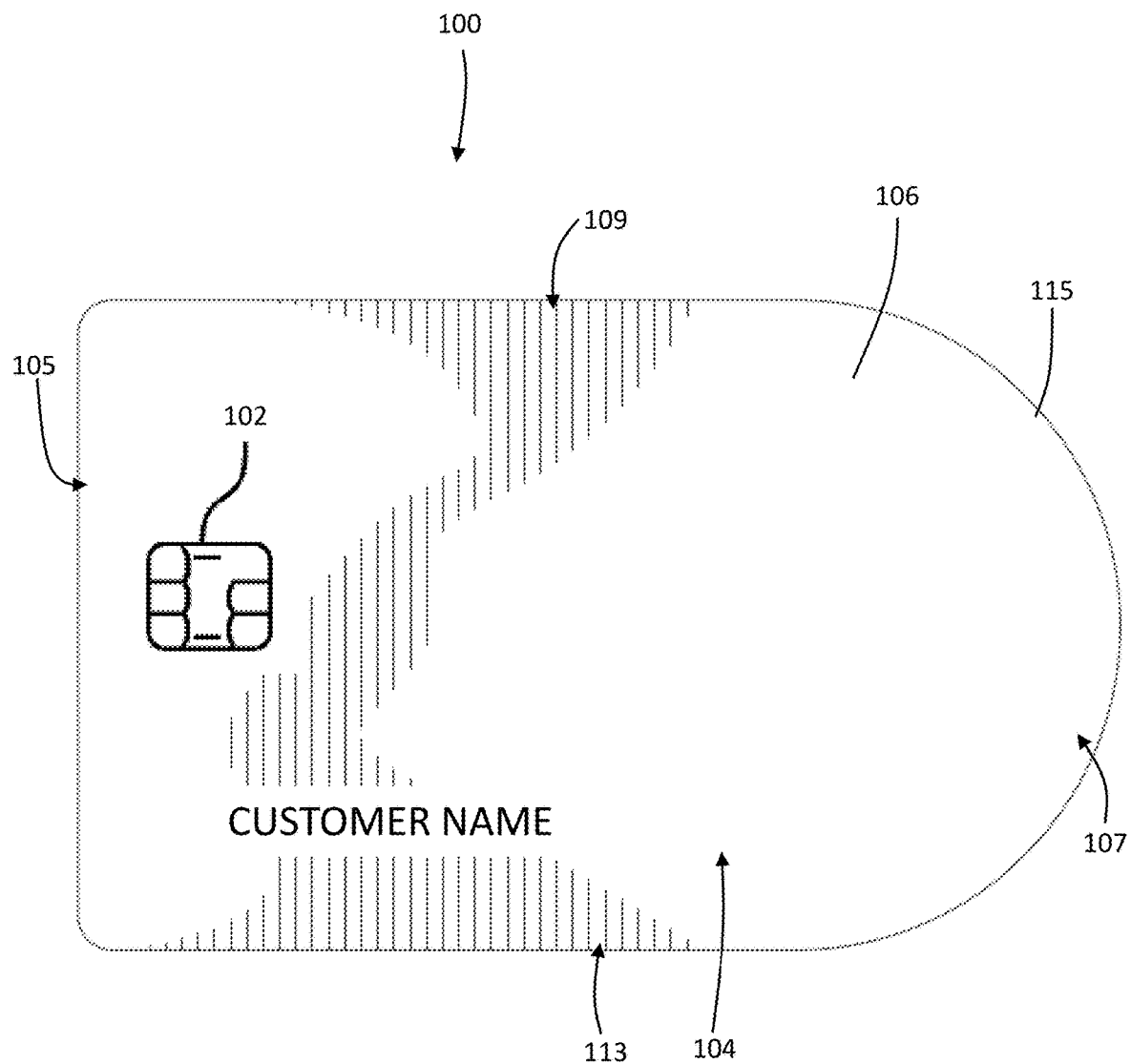
FIG. 1B is a top view of the transaction card of FIG. 1A, in accordance with embodiments of the present disclosure.

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements. Furthermore, certain elements in some of the figures may be omitted, or illustrated not-to-scale, for illustrative clarity. Still furthermore, some reference numbers may be omitted in certain drawings.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so this disclosure will be thorough and complete, and will fully convey the scope of the subject matter to those skilled in the art. In the drawings, like numbers refer to like elements throughout.

Embodiments herein are directed to transaction cards having an ergonomic textured grip. In some embodiments, the textured grip is a digital print formed on an exterior surface of the transaction card to create a tactile feel for easier swiping of cards. The grip also creates a design object as a visual indicator on the appropriate orientation for swiping a card of virtually any shape.

Referring now to FIGS. 1A-1D, an example transaction card (hereinafter "card") 100 according to embodiments of the disclosure will be described. The card 100 may be a contactless credit or debit card, a RFID passport, or an access card. The card 100 may be contactless due to the method of communication by an identification chip 102, such as a RFID chip. For example, the card 100 may use near field communications technology for bi-directional or uni-directional contactless short-range communications based on, for example, radio frequency identification (RFID) standards, an EMV standard, or using NFC Data Exchange Format (NDEF) tags. The communication may use magnetic field induction to enable communication between electronic devices, including mobile wireless communications devices. Short-range high frequency wireless communications technology enables the exchange of data between devices over a short distance, such as only a few centimeters.

The card 100 may also provide one or more functions requiring contact. For example, the card 100 may include a magnetic stripe 101 and an identification chip 102 connected to contacts present on an outer layer of the card 100. The magnetic stripe 101 may contain cardholder data in accordance with standard protocols.

As shown, the card 100 includes a body 104 having a first main side 106 and a second main side 108 opposite the first main side 106. Although non-limiting, the first main side 106 may correspond to a front or top side of the card 100, while the second main side 108 may correspond to a back or bottom side of the card 100. Furthermore, the body 104 may include a first end 105 opposite a second end 107, and a first side 109 opposite a second side 113. In some embodiments, the body 104 may include a partially-curved shape in which the second end 107 includes a rounded perimeter edge 115, and the first end 105 is generally rectangular. In other designs, the first and second ends 105, 107 of the body 104 may include shapes that may be characterized as triangular, angled, rounded, curved, scalloped, rectangular, etc.

The card 100 may include multiple layers each having one or more functions. In non-limiting embodiments, the card 100 may be made from polyvinyl chloride (PVC), polyester, or polycarbonate. An exterior layer or surface 103 of the first main side 106 may be a CNC or laser radial brush e-coat to minimize wear and fingerprints. In some embodiments, e-coating is performed by an immersion wet paint finishing process that uses electrical current to attract the paint product to an exterior surface of the card. This process is also referred to as paint deposition. The E-coat process is a dipping (immersion) system similar to what is used in metal plating except the finish uses organic paint particles not metal particles in the immersion baths.

The identification chip 102 may be coupled (e.g., recessed or partially embedded) to the first main side 106 of the card 100. As used herein, the identification chip 102 may be any microprocessor device configured to exchange data electromagnetically, such as a RFID chip. The RFID chip may include a radio frequency inductor, volatile or non-volatile memory storage, a microprocessor, circuitry logic, and/or an antenna. While in some embodiments electromagnetic data communications from the RFID chip will take place at radio frequencies, other embodiments may exchange electromagnetic data at different frequencies.

The card 100 may further include a textured grip 110 along the second main side 108 of the body 104. As shown, the textured grip 110 may include a plurality of curvilinear grip elements 111 extending in a wavy or undulating arrangement between a first end 112 and a second end 114 thereof. The textured grip 110 may be positioned proximate the second side 113 and the second end 107 of the body 104. The plurality of curvilinear grip elements 111 may be formed as a series of ridges extending from the exterior surface 103 of the second main side 106 of the body 104.

As shown, the magnetic stripe 101 is positioned proximate the first side 109 of the body, opposite the textured grip 110, which is positioned along the second side 113. A central portion 122 of the body 104 separates the textured grip 110 and the magnetic stripe 101. Meanwhile, the identification chip 102 may be positioned proximate the first end 105 of the body 104. The position of the textured grip 110 near the second end 107 of the body 104 along the second main side 108 provides users with a tactile and visual design object for appropriate orientation of the card 100 relative to an ATM or point-of-sale (POS) device. In some embodiments, the textured grip 110 may be formed along just a portion of the second main side 108 to provide users with a way of distinguishing between the first and second ends 105, 107 of the card 100.

Although not shown, the card 100 may include identifying indicia, such as an account or card number, on the first main side 106 thereof, as well as a cardholder name. Although non-limiting, the card number may be a 16-digit number (e.g., four groups of four digits) extending across the first main side 106. In other embodiments, the card number may include a different number of digits. The card 100 may include other identifying indicia disposed on the second main side 108 thereof. In some embodiments, the additional identifying indicia may be a card verification value (CVV). Depending on the type of card, the CVV may be present on or near a signature strip (not shown).

Figure 2:
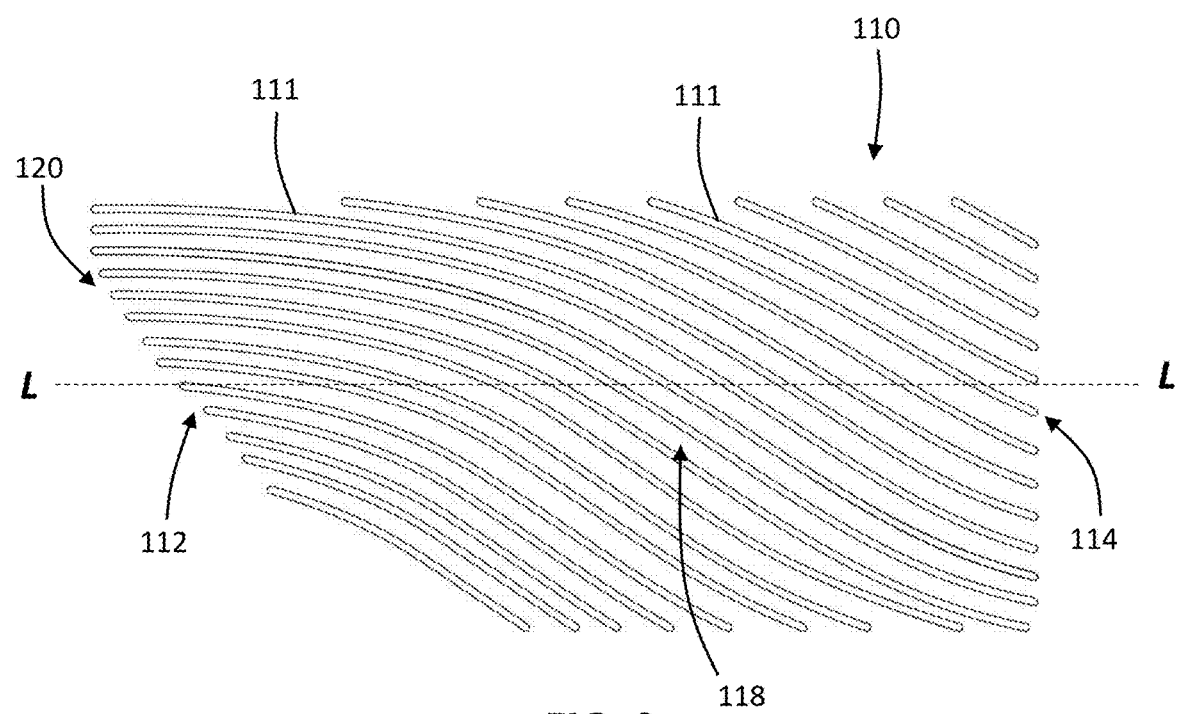
FIG. 2 is top view of a textured grip, in accordance with embodiments of the present disclosure.

Turning now to FIG. 2, the textured grip 110 according to embodiments of the present disclosure will be described in greater detail. As stated above, the textured grip 110 includes a plurality of curvilinear grip elements 111 extending in an undulating arrangement between the first end 112 and the second end 114 thereof as well. In the non-limiting embodiment shown, the textured grip 110 may include a partially-curved shape in which the first end 112 includes a sloped or angled perimeter edge 120, while the second end 114 is generally rectangular. The perimeter edge 120 may generally follow the shape of the rounded perimeter edge 115 of the second end 107 of the body, e.g., as best shown in FIG. 1C.

In non-limiting embodiments, the plurality of curvilinear grip elements 111 at the first end 112 of the textured grip 110 are arranged to be substantially parallel to a lengthwise axis L-L extending between the first and second ends 112, 114 of the textured grip 110. The plurality of curvilinear grip elements 111 at the second end 114 of the textured grip 110 may be oriented at a non-zero angle with respect to the lengthwise axis L-L. The plurality of curvilinear grip elements 111 may extend outwardly from the exterior surface 103 (FIGS. 1A and 1C). In other embodiments, the textured grip 110 may be embossed such that the plurality of curvilinear grip elements 111 may be depressed or extend inwards towards the first main side 106 of the card 100.

As shown, spacing between each of the plurality of curvilinear grip elements 111 may vary between the first and second ends 112, 114 of the textured grip 110. For example, the plurality of curvilinear grip elements 111 may be arranged farther apart from one another in a central area 118 of the textured grip 110, and closer to one another at the first and/or second ends 112, 114. In some embodiments, the plurality of curvilinear grip elements 111 may be arranged closer to one another at the first end 112, and farther apart from one another at the second end 114. In yet other embodiments, the height and/or thickness of the plurality of curvilinear grip elements 111 may vary in different locations of the textured grip 110.

In some embodiments, the plurality of curvilinear grip elements 111 of the textured grip 110 may be one or more layers of a clear coat resin. For example, the plurality of curvilinear grip elements 111 may be formed of an acrylic resin (e.g., any of numerous thermoplastic or thermosetting polymers or copolymers of acrylic acid, methacrylic acid, any esters of these acids, or acrylonitrile), ultra violet (UV) curable resin blend including polyester, urethane, diol and carboxyl acrylates with ceramic particles, multifunctional acrylate polymers or any like material. The clear coat resin layer(s) may be applied (or formed) by spraying, screen printing, painting, powder coating or any other like method, and cured or processed by UV cure, electron beam curing, oven heat, a radiation curing method, or in any other suitable manner.

Figure 3:
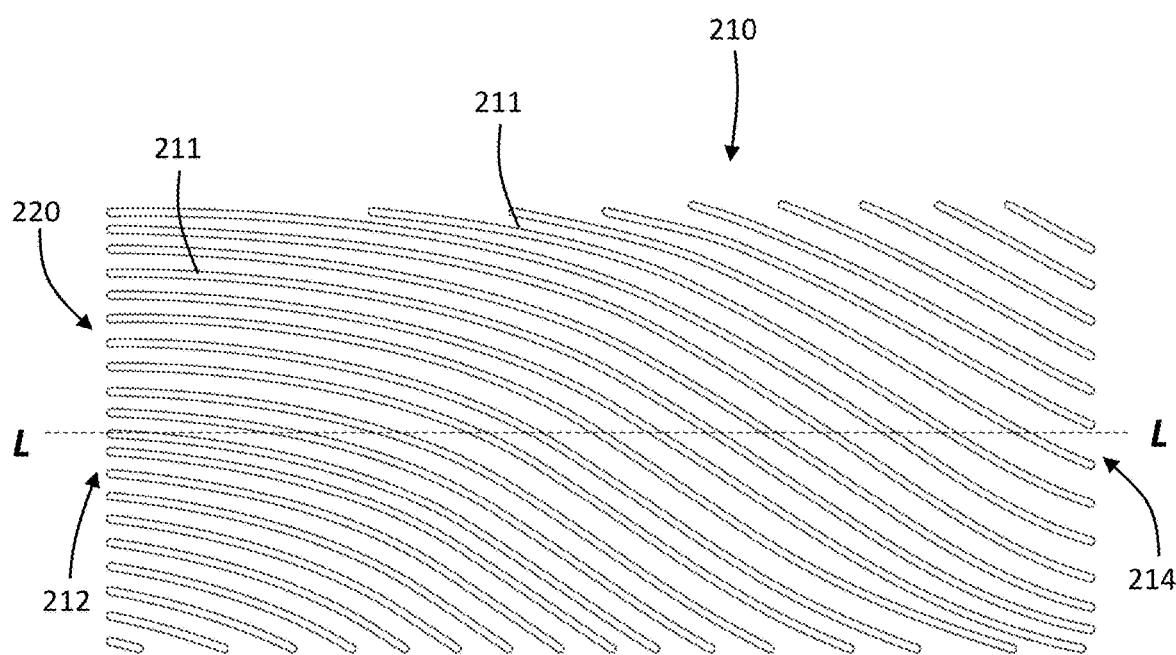
FIG. 3 is top view of another textured grip, in accordance with embodiments of the present disclosure.

Turning now to FIG. 3, a textured grip 210 according to an alternative embodiment of the present disclosure will be described in greater detail. The textured grip 210 may share many of the same features as the textured grip 110 described above. As such, not all of the features of the textured grip 210 will be discussed in detail for the sake of brevity. As shown, the textured grip 210 includes a plurality of curvilinear grip elements 211 extending in an undulating arrangement between the first end 212 and the second end 214 thereof. At least some of the plurality of curvilinear grip elements 211 at the first end 212 of the textured grip 210 may be arranged to be substantially parallel to the lengthwise axis L-L extending between the first and second ends 212, 214 of the textured grip 210. In the non-limiting embodiment shown, the textured grip 210 may be formed in an overall rectangular shape, wherein the first and second ends 212, 214 are generally the same. The perimeter edge 220 along the first end 212 may generally follow the shape of a rectangular perimeter edge a card (not shown). In other designs, the textured grip 210 may include shapes that may be characterized as triangular, angled, rounded, curved, etc.

FIG. 4 illustrates a non-limiting method 300 for forming a transaction card, such as the card 100 above, in accordance with embodiments of the present disclosure. At block 302, the method 300 may include providing a body having first and second main sides, the first main side including an identification chip and the second main side including a magnetic stripe. In some embodiments, the magnetic stripe may contain cardholder data in accordance with standard protocols. In some embodiments, the magnetic stripe may be positioned along a first side of the body of the card.

At block 304, the method 300 may include forming a textured grip along the second main side of the body. The textured grip may include a plurality of curvilinear grip elements extending in an undulating arrangement between first and second ends thereof. The textured grip may be positioned proximate a second side of the body, opposite the magnetic stripe positioned along the first side of the body.

In some embodiments, forming the textured grip includes applying one or more layers of a clear coat resin to an exterior surface of the second main side of the body. In some embodiments, the plurality of curvilinear grip elements are arranged to be substantially parallel to a lengthwise axis at the first end of the textured grip. In some embodiments, the textured grip is provided proximate the second end of the body, while the identification chip is provided proximate the first end. A central portion of the body may separate the textured grip and the identification chip. In some embodiments, the plurality of curvilinear grip elements is formed as a series of ridges extending from an exterior surface of the second main side of the body. A spacing between each of the series of ridges may vary between the first and second ends of the textured grip.

Figure 5:
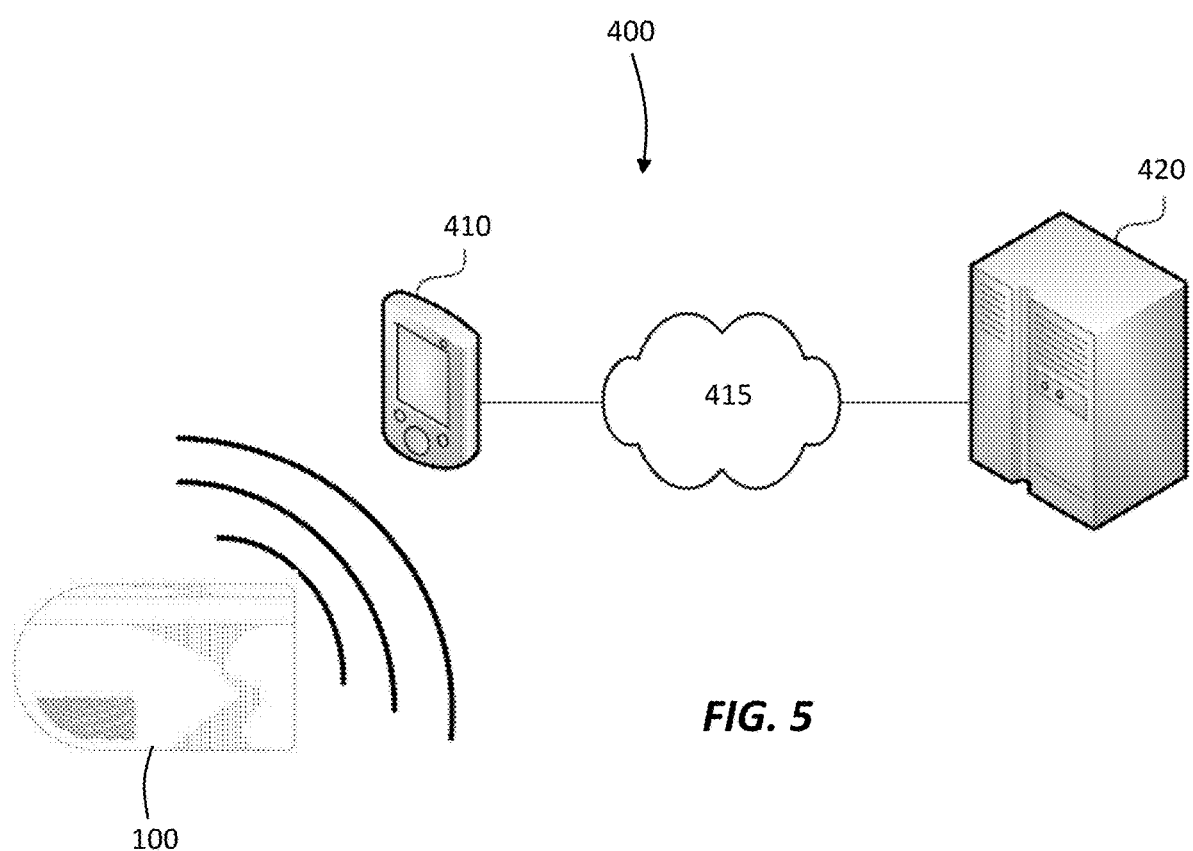
FIG. 5 is a diagram of a data transmission system in accordance with embodiments of the present disclosure.

Turning now to FIG. 5, the card 100 having a textured grip described above, may operate with an exemplary data transmission system (hereinafter "system") 400. The system 400 may include the card 100, a client device 410, a network 415, and a server 420. The system 400 may include one or more contact or contactless cards 100, which may be in wireless communication, for example NFC communication, with the client device 410.

The system 400 may include the client device 410, which may be a network-enabled computer. As referred to herein, a network-enabled computer may include, but is not limited to: e.g., a computer device, or communications device including, e.g., a server, a network appliance, a personal computer (PC), a workstation, a mobile device, a phone, a handheld PC, a personal digital assistant (PDA), a thin client, a fat client, an Internet browser, or other device. The client device 410 also may be a mobile device; for example, a mobile device may include an iPhone, iPod, iPad from Apple® or any other mobile device running Apple's iOS operating system, any device running Microsoft's Windows® Mobile operating system, and/or any other smartphone or like wearable mobile device.

In various examples according to the present disclosure, the client device 410 of the system 400 may execute one or more applications, such as software applications, that enable, for example, network communications with one or more components of the system 400 and transmit and/or receive data.

The client device 410 may be in communication with one or more servers 420 via one or more networks 415, and may operate as a respective front-end to back-end pair with server 420. The client device 410 may transmit, for example from a mobile device application executing on the client device 410, one or more requests to the server 420. The one or more requests may be associated with retrieving data from the server 420. The server 420 may receive the one or more requests from the client device 410. Based on the one or more requests from the client device 410, the server 420 may be configured to retrieve the requested data from one or more databases (not shown). Based on receipt of the requested data from the one or more databases, the server 420 may be configured to transmit the received data to the client device 410, the received data being responsive to one or more requests.

The system 400 may include one or more networks 415. In some examples, the network 415 may be one or more of a wireless network, a wired network or any combination of wireless network and wired network, and may be configured to connect the client device 410 to the server 420. For example, the network 415 may include one or more of a fiber optics network, a passive optical network, a cable network, an Internet network, a satellite network, a wireless LAN, a Global System for Mobile Communication (GSM), a Personal Communication Service (PCS), a Personal Area Network (PAN), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, Bluetooth, Near Field Communication (NFC), Radio Frequency Identification (RFID), Wi-Fi, and/or the like.

In addition, the network 415 may include, without limitation, telephone lines, fiber optics, IEEE Ethernet 902.3, a wide area network (WAN), a wireless personal area network (WPAN), a local area network (LAN), or a global network such as the Internet. In addition, network 415 may support an Internet network, a wireless communication network, a cellular network, or the like, or any combination thereof. The network 415 may further include one network, or any number of the exemplary types of networks mentioned above, operating as a stand-alone network or in cooperation with each other. The network 415 may utilize one or more protocols of one or more network elements to which they are communicatively coupled. The network 415 may translate to or from other protocols to one or more protocols of network devices. Although the network 415 is depicted as a single network, it should be appreciated that according to one or more examples, the network 415 may comprise a plurality of interconnected networks, such as, for example, the Internet, a service provider's network, a cable television network, corporate networks, such as credit card association networks, and home networks.

In some embodiments, the system 400 may include one or more servers 420. In some examples, the server 420 may include one or more processors, which are coupled to memory. The server 420 may be configured as a central system, server or platform to control and call various data at different times to execute a plurality of workflow actions. The server 420 may be configured to connect to the one or more databases. The server 420 may be connected to at least one client device 410.

In summation, embodiments described herein advantageously provide an ergonomic textured grip to aid users having issues holding the transaction cards correctly. The design of the cards described herein create a tactile feel for easier swiping of cards, while also creating a design object as a visual indicator on the appropriate orientation for swiping on a card of virtually any shape. As a result, users will have a better experience when using the card at an ATM or POS device.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

Although non-limiting, the card 100 described herein may have standardized or non-standardized dimensions. For example, ISO/IEC 7816 is an international standard related to electronic identification cards with contacts, especially smart cards, managed jointly by the International Organization for Standardization (ISO) and the International Electrotechnical Commission (IEC). There are other standards, however, such as ISO/IEC 14443 for transaction cards (PayPass, PayWave, ExpressPay). A further standard ISO/IEC 7810 ID-1, with which most credit cards are compliant, defines dimensions as 85.60×53.98 mm (3.370×2.125 in) and a thickness of 0.76 mm (0.030 in).

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

Still furthermore, although the illustrative method 300 is described above as a series of acts or events, the present disclosure is not limited by the illustrated ordering of such acts or events unless specifically stated. For example, some acts may occur in different orders and/or concurrently with other acts or events apart from those illustrated and/or described herein, in accordance with the disclosure. In addition, not all illustrated acts or events may be required to implement a methodology in accordance with the present disclosure. Furthermore, the method 300 may be implemented in association with the formation and/or processing of structures illustrated and described herein as well as in association with other structures not illustrated.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A card, comprising:
a body having a first main side and a second main side, a first end opposite a second end, and a first side opposite a second side, wherein a first axis extending between the first and second ends, and a second axis extending between the first and second sides, defines the body into quadrants;
an identification chip along the first main side of the body;
a magnetic stripe along the second main side of the body, wherein the magnetic stripe extends across a first quadrant and a second quadrant, and wherein the first and second quadrants are located on opposite sides of the second axis; and
a textured grip along the second main side of the body, wherein the textured grip comprises a plurality of curvilinear-shaped grip elements extending in an undulating arrangement between a first end and a second end of the textured grip, wherein the textured grip is provided along the second main side of the body, wherein the textured grip is located only within a third quadrant, wherein the third quadrant and the first quadrant are located on opposite sides of the first axis, wherein the identification chip is located within the second quadrant or a fourth quadrant, and wherein the second and fourth quadrants are located on opposite sides of the first axis.

2. The card of claim 1, wherein the second end of the body includes a rounded perimeter edge.

3. The card of claim 1, wherein a spacing between each of the plurality of curvilinear-shaped grip elements varies between the first and second ends of the textured grip.

4. The card of claim 1, wherein the plurality of curvilinear-shaped grip elements extends from an exterior surface of the second main side of the body.

5. The card of claim 1, wherein the textured grip comprises one or more layers of a clear coat resin.

6. A transaction card, comprising:
a body having a first main side and a second main side, a first end opposite a second end, and a first side opposite a second side, wherein a first axis extending between the first and second ends, and a second axis extending between the first and second sides, defines the body into quadrants;
an identification chip coupled to the first main side of the body; and
a textured grip and a magnetic stripe disposed along the second main side of the body, wherein the magnetic stripe extends across a first quadrant and a second quadrant, and wherein the first and second quadrants are located on opposite sides of the second axis, wherein the textured grip comprises a plurality of curvilinear-shaped grip elements extending in an undulating arrangement between a first end and a second end of the textured grip, wherein the textured grip is provided along the second main side of the body, wherein the textured grip is located only within a third quadrant, wherein the third quadrant and the first quadrant are located on opposite sides of the first axis, wherein the identification chip is located within the second quadrant or a fourth quadrant, and wherein the second and fourth quadrants are located on opposite sides of the first axis.

7. The transaction card of claim 6, wherein a spacing between each of the plurality of curvilinear grip elements varies between the first and second ends of the textured grip.

8. The transaction card of claim 6, wherein the plurality of curvilinear-shaped grip elements are separated from one another and extend from an exterior surface of the second main side of the body.

9. The transaction card of claim 6, wherein the textured grip comprises one or more layers of a clear coat resin.

10. A method of forming a card comprising:
providing a body having a first main side and a second main side, a first end opposite a second end, and a first side opposite a second side, wherein a first axis extending between the first and second ends, and a second axis extending between the first and second sides, defines the body into quadrants, wherein the first main side includes an identification chip and the second main side includes a magnetic stripe, wherein the magnetic stripe extends across a first quadrant and a second quadrant, and wherein the first and second quadrants are located on opposite sides of the second axis; and
forming a textured grip along the second main side of the body, wherein the textured grip comprises a plurality of curvilinear-shaped grip elements extending in an undulating arrangement between a first end and a second end of the textured grip, wherein the textured grip is provided along the second main side of the body, wherein the textured grip is located only within a third quadrant, wherein the third quadrant and the first quadrant are located on opposite sides of the first axis, wherein the identification chip is located within the second quadrant or a fourth quadrant, and wherein the second and fourth quadrants are located on opposite sides of the first axis.

11. The method of claim 10, wherein forming the textured grip comprises applying one or more layers of a clear coat resin to an exterior surface of the second main side of the body.

12. The method of claim 10, further comprising arranging at least one of the plurality of curvilinear grip elements at the first end of the textured grip to be substantially parallel to a lengthwise axis extending between a first end and a second end of the body.

13. The method of claim 10, further comprising forming the plurality of curvilinear-shaped grip elements as a series of ridges extending from an exterior surface of the second main side of the body, and wherein a spacing between each of the series of ridges varies between the first and second ends of the textured grip.

\* \* \* \* \*